June 3, 1930.                T. D. DAVIES                1,761,709
                              DRILL TUBE
                          Filed Dec. 21, 1925
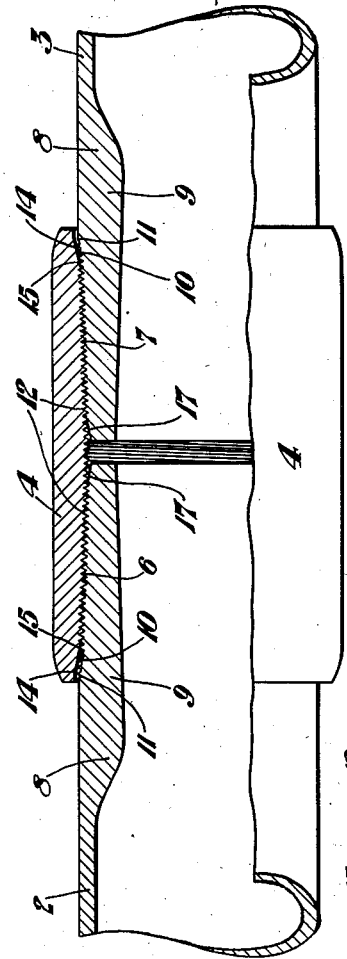
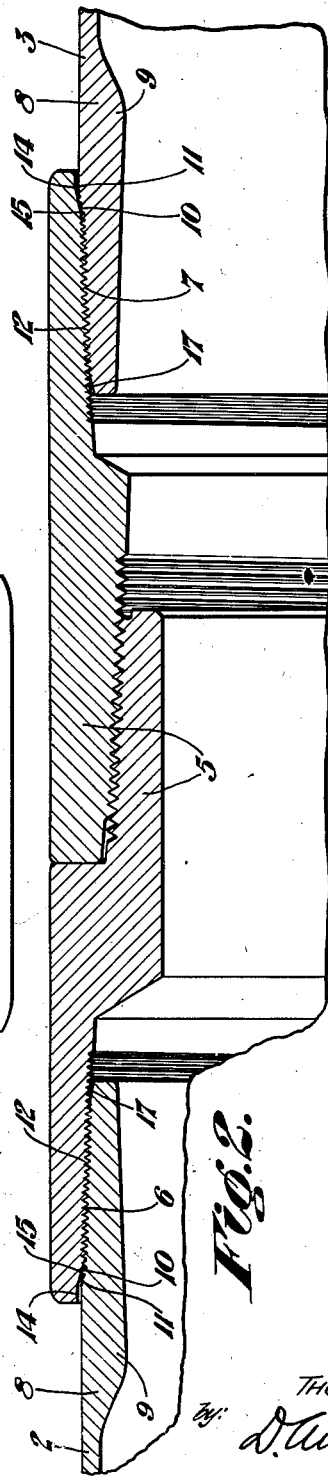
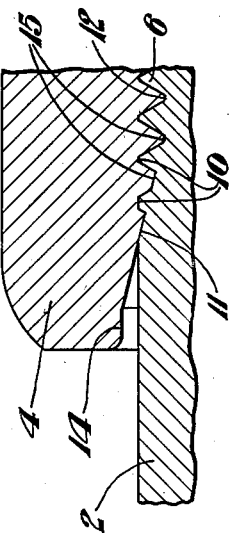
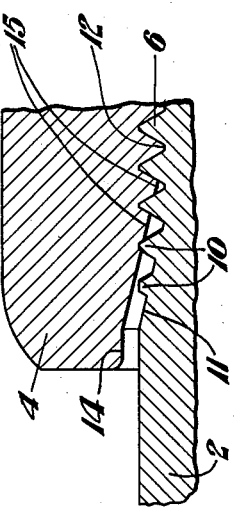
Witnesses:
Edwin Trueb
Inventor:
THOMAS D. DAVIES,
By: D. Anthony Usina
his Attorney.

Patented June 3, 1930

1,761,709

UNITED STATES PATENT OFFICE

THOMAS D. DAVIES, OF McKEESPORT, PENNSYLVANIA, ASSIGNOR TO NATIONAL TUBE COMPANY, A CORPORATION OF NEW JERSEY

DRILL TUBE

Application filed December 21, 1925. Serial No. 76,867.

This invention relates to drill tubes and pipes and more particularly to a novel form of joint for drill tubes and pipes such as used in drilling wells by the rotary drill system.

One object of this invention is to provide a novel form of pipe or tube joint in which the portion of the pipe or tube is below the root of the last full thread, thereby materially lessening the likelihood of breakage.

Another object of this invention is to provide a novel form of pipe or tube joint in which the threads of the coupling engage all the full threads on the pipe or tube, thereby giving the greatest possible area of contact and preventing breakage.

A further object of this invention is to provide a pipe or tube joint in which a secondary bearing is provided adapted to be effective after the pipe or tube has crept a predetermined amount during the drilling operation, thereby preventing excessive creeping.

A still further object of this invention is to provide a pipe or tube joint in which the ends of the pipes or tubes are chamfered to the same angle as the vanishing threads at the bottom of the recess of the coupling, whereby stabbing of the joint is facilitated and injury to the starting threads is prevented.

In the drawings:

Figure 1 is a sectional elevation through a pipe joint embodying my invention.

Figure 2 is a sectional elevation through a pipe joint, in the form of a tool joint, embodying my invention.

Figure 3 is an enlarged fragmentary elevation showing the joint as first made up tight with all full threads engaged.

Figure 4 is a view similar to Figure 3 showing the secondary bearing after the pipe has crept during the drilling operation.

Referring more particularly to the drawings, the numerals 2 and 3 designate the pipe sections as a whole which in Figure 1 are joined by an internally threaded coupling 4, and in Figure 2 are joined by a box and pin type tool joint coupling 5.

The pipe sections 2 and 3 are provided with external threads 6 and 7, respectively, and are upset internally at each end as at 8, with the upset increasing in thickness inwardly from the end of the pipe so that the thickest portion of the upsets underlying the threaded portions 6 and 7 are below the root of the last full thread as at 9. The upset portions 8 are of substantially constant thickness from the point 9 rearwardly so as to permit rethreading of the pipe ends when the threads become worn.

The threads 6 and 7 on the pipe sections are preferably what are known as the rounded form of threads and are cut in the usual manner to provide vanishing threads 10 on the shoulder 11 of the pipe.

The couplings 4 and 5 are provided with internal threads 12 to receive the threaded ends of the pipes 2 and 3 and are recessed at each end as at 14. The couplings 4 and 5 are provided with vanishing threads 15 at the bottom of the recesses 14 at each end as is usual. The vanishing threads 10 on the shoulder of the pipe and the vanishing threads 15 at the bottom of the recesses 14 at each end of the couplings 4 and 5 are cut to exactly the same angle, which angle is gaged so that after the pipe has crept one and one-half turns during the drilling operation, these angles will form a secondary bearing to that of the thread tapers.

When the coupling of Figure 1 is used the parts are so formed and sized that when the vanishing threads 10 and 15 are engaged to form a secondary bearing, the ends of the pipes 2 and 3 will have butted in the center of the coupling, thus eliminating excessive creeping in service, which has heretofore been the principal cause of galling on drill pipe.

The threads 6 and 7 on the pipe sections 2 and 3 are chamfered as at 17, to the same angle as the vanishing threads 15 at the bottom of the recesses 14 of the coupling members 4 and 5, thereby assisting in stabbing the joint and preventing injury to the starting threads.

The phrase "stabbing the joint" as used in this specification is a common phrase used in the drilling art to describe the operation of inserting a tube section in a coupling when assembling the drill tube.

The novel joint of this invention provides great strength with ease of operation and permits the user to obtain the maximum of service from the pipes or tubes.

I claim:

In combination two sections of drill pipe arranged with their ends opposite each other and having their end portions threaded on the exterior surface, and an internally threaded coupling member screwed onto said abutting ends of said pipe sections to connect the same, said coupling being recessed at each end and provided with vanishing threads at the bottom of the recess portions, and said pipe sections having the ends of their threaded portions chamfered to the same angle as the angle of the vanishing threads at the bottom of the recess portions of said coupling, to assist in stabbing the joint and preventing injury to the starting threads.

In testimony whereof, I have hereunto signed my name.

THOMAS D. DAVIES.